(12) United States Patent
Moon

(10) Patent No.: US 9,558,124 B2
(45) Date of Patent: Jan. 31, 2017

(54) DATA STORAGE SYSTEM WITH PASSIVE PARTITIONING IN A SECONDARY MEMORY

(71) Applicant: Seagate Technology LLC, Cupertino, CA (US)

(72) Inventor: John Edward Moon, Superior, CO (US)

(73) Assignee: Seagate Technology LLC, Cupertino, CA (US)

( * ) Notice: Subject to any disclaimer, the term of this patent is extended or adjusted under 35 U.S.C. 154(b) by 119 days.

(21) Appl. No.: 14/075,842

(22) Filed: Nov. 8, 2013

(65) Prior Publication Data

US 2015/0134877 A1 May 14, 2015

(51) Int. Cl.
*G06F 12/08* (2016.01)

(52) U.S. Cl.
CPC ... *G06F 12/0871* (2013.01); *G06F 2212/6012* (2013.01)

(58) Field of Classification Search
CPC ............... G06F 12/0246; G06F 3/0679; G06F 2212/2022; G06C 16/102
See application file for complete search history.

(56) References Cited

U.S. PATENT DOCUMENTS

| | | | |
|---|---|---|---|
| 6,725,336 B2 | 4/2004 | Cherabuddi | |
| 7,173,863 B2 | 2/2007 | Conley et al. | |
| 7,644,231 B2 | 1/2010 | Recio et al. | |
| 7,861,038 B2 | 12/2010 | Fontenot et al. | |
| 8,006,037 B2 | 8/2011 | Kirshenbaum et al. | |
| 8,086,791 B2 | 12/2011 | Caulkins | |
| 8,140,724 B1* | 3/2012 | Yoon et al. | 710/74 |
| 8,724,392 B1* | 5/2014 | Asnaashari | G06F 3/0604 365/158 |
| 2001/0001157 A1* | 5/2001 | Oura | G01R 31/31722 714/42 |
| 2006/0047888 A1* | 3/2006 | Nishihara | G06F 12/0802 711/103 |
| 2006/0090031 A1 | 4/2006 | Kirshenbaum et al. | |
| 2006/0179225 A1* | 8/2006 | Wester | G06F 9/3802 711/125 |
| 2006/0184740 A1* | 8/2006 | Ishikawa | G06F 12/084 711/129 |
| 2006/0230226 A1 | 10/2006 | Meir et al. | |
| 2006/0248308 A1* | 11/2006 | Wang | G06F 11/2089 711/173 |
| 2007/0079065 A1* | 4/2007 | Bonella | G06F 13/405 711/113 |
| 2007/0288692 A1* | 12/2007 | Bruce | G06F 3/061 711/113 |
| 2008/0147964 A1* | 6/2008 | Chow | G06F 21/34 711/103 |

(Continued)

*Primary Examiner* — Mano Padmanabhan
*Assistant Examiner* — Jean Edouard
(74) *Attorney, Agent, or Firm* — Hall Estill Attorneys at Law

(57) ABSTRACT

A data storage system may be configured at least with a primary memory that is coupled to a host via a controller and coupled to at least one external interface. The controller may be adapted to passively partition a secondary memory into cache and user memory space regions in response to the secondary memory engaging the at least one external interface and the cache region can be allocated as cache for the primary memory by the controller.

20 Claims, 4 Drawing Sheets

(56) References Cited

U.S. PATENT DOCUMENTS

| | | | |
|---|---|---|---|
| 2008/0162797 A1* | 7/2008 | Teicher | G06F 3/0616 711/103 |
| 2008/0276037 A1* | 11/2008 | Chang et al. | 711/103 |
| 2009/0144495 A1 | 6/2009 | Kirshenbaum et al. | |
| 2010/0017556 A1* | 1/2010 | Chin | G06F 12/0246 711/103 |
| 2010/0146205 A1* | 6/2010 | Baum | G06F 12/0804 711/113 |
| 2010/0161933 A1* | 6/2010 | Moon | G06F 12/0246 711/205 |
| 2010/0169550 A1* | 7/2010 | Akita | G06F 12/0868 711/103 |
| 2010/0172180 A1* | 7/2010 | Paley | G06F 12/0246 365/185.12 |
| 2010/0217929 A1 | 8/2010 | Kirshenbaum et al. | |
| 2010/0262857 A1* | 10/2010 | Enarson | G06F 11/0766 714/2 |
| 2010/0293420 A1* | 11/2010 | Kapil | G06F 12/08 714/710 |
| 2010/0312983 A1* | 12/2010 | Moon | G06F 3/061 711/170 |
| 2011/0022801 A1* | 1/2011 | Flynn | 711/120 |
| 2011/0029723 A1* | 2/2011 | Lee | G06K 19/07732 711/103 |
| 2011/0202707 A1* | 8/2011 | Moon | G06F 3/061 711/103 |
| 2011/0276745 A1 | 11/2011 | Danilak | |
| 2012/0221774 A1* | 8/2012 | Atkisson | G06F 12/0802 711/103 |
| 2012/0233385 A1 | 9/2012 | Meir et al. | |
| 2012/0297121 A1* | 11/2012 | Gorobets | G06F 12/0246 711/103 |
| 2012/0311293 A1* | 12/2012 | Nemazie | G11C 16/0483 711/171 |
| 2013/0132650 A1* | 5/2013 | Choi | G06F 12/02 711/103 |
| 2013/0173844 A1* | 7/2013 | Chen | G06F 12/0246 711/103 |
| 2013/0185475 A1* | 7/2013 | Talagala | G06F 12/0866 711/102 |
| 2013/0185488 A1* | 7/2013 | Talagala | G06F 12/0246 711/103 |
| 2013/0219146 A1* | 8/2013 | Confalonieri | G06F 12/0246 711/202 |
| 2013/0275661 A1* | 10/2013 | Zimmer | G06F 12/0246 711/103 |
| 2013/0282955 A1* | 10/2013 | Parker | G06F 12/0246 711/103 |

\* cited by examiner

DATA STORAGE SYSTEM WITH PASSIVE PARTITIONING IN A SECONDARY MEMORY

SUMMARY

Assorted embodiments may configure a data storage system with a primary memory that is coupled to a host via a controller and coupled to at least one external interface. The controller may be adapted to passively partition a secondary memory into cache and user memory space regions in response to the secondary memory engaging the at least one external interface and the cache region can be allocated as cache for the primary memory by the controller.

DETAILED DESCRIPTION

The continued industry and consumer emphasis on mobile computing systems has stressed the physical size, computing speed, and connectivity of a data storage system. The advent of solid-state memories to supplement rotating data storage means has increased data storage capacity and data access speeds, but can have larger physical dimensions, small data capacity, and increased risk of data loss. For example, flash memory used to supplement a hard disk drive can wear out over a number of data accesses that can jeopardize the integrity of data stored therein as well as degrade data storage and computing performance. Hence, industry continues to strive for more efficient and reliable manners of complementing a primary data storage memory with a secondary data storage memory.

Accordingly, a data storage system may be configured with at least a primary memory that is coupled to a host via a controller and coupled to at least one external interface. The controller may be adapted to passively partition a secondary memory into cache and user memory space regions in response to the secondary memory engaging the at least one external interface and to allocate the cache region as cache for the primary memory. The ability to supplement the primary memory with secondary memory at will can provide additional data storage capabilities that can increase computing performance. Moreover, the passive partitioning of a secondary memory can allow seamless integration of additional data storage capabilities that can be selectively utilized to optimize data access speed while maintaining data integrity.

Figure 1:
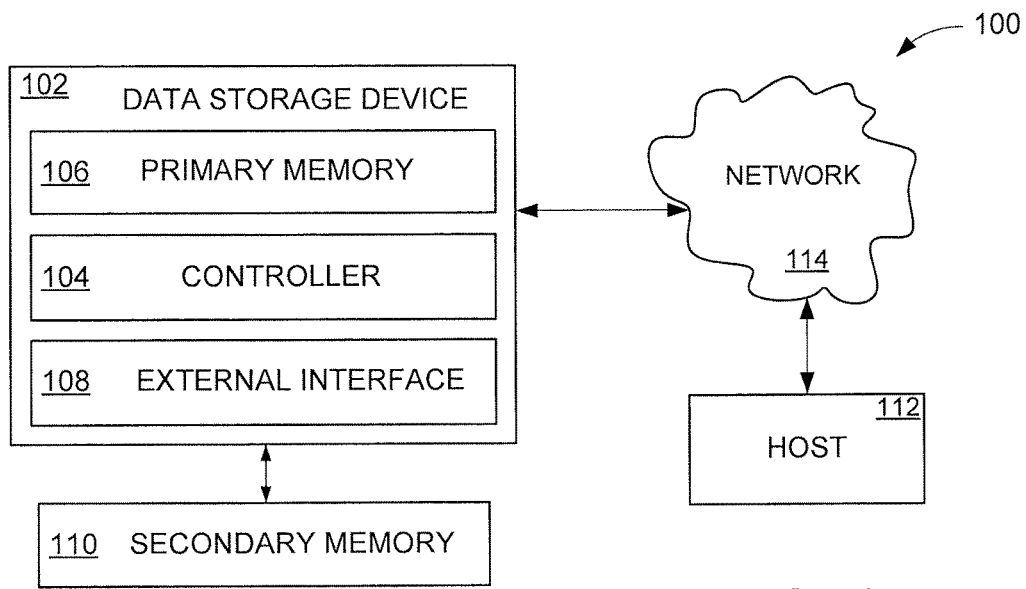
FIG. 1 is a block representation of a portion of an example data storage system configured in accordance with some embodiments.

While a secondary memory can be configured to supplement an unlimited variety of different data storage environments, FIG. 1 generally displays an example data storage system 100 that can employ secondary memories in accordance with various embodiments. The data storage system 100 may have any number of data storage devices 102 that comprise a local controller 104 and a non-volatile primary memory means 106, such as a solid-state memory array and rotating data storage medium. Each data storage device 102 of the data storage system 100 can operate individually and collectively to provide storage of data from a local host, such as a processor and operating system.

The primary memory 106 can be accessed by the local controller 104 to facilitate a diverse variety of data storage capabilities, such as temporary and permanent storage of host data. The data storage device 102 can have at least one external interface 108, such as a universal serial bus (USB), serial attached Small Computer System Interface (SAS), and serial advanced technology attachment (SATA), to allow one or more secondary memories 110 to be used exclusively and in conjunction with the primary memory 104. The ability to utilize a secondary memory 110 that exhibits different data storage characteristics, such as data access speed and capacity, can complement the primary memory 106 and provide a user with greater data storage capacity and faster data access speeds.

While the secondary memory 110 can be physically connected to the data storage device 102, additional capacity, control, and processing can be provided by a remote host 112 via a network 114 that is wired or wireless and accessed via appropriate protocols. The remote host 112 can allow supplemental computing capabilities, like virtual machines, and network connectivity, like access to local area networks (LAN), to optimize data storage performance in the data storage device 102. However, network availability cannot always be guaranteed, which poses a practical difficulty in increasingly mobile computing systems like smartphones, laptop computers, and tablet computing devices.

Figure 2:
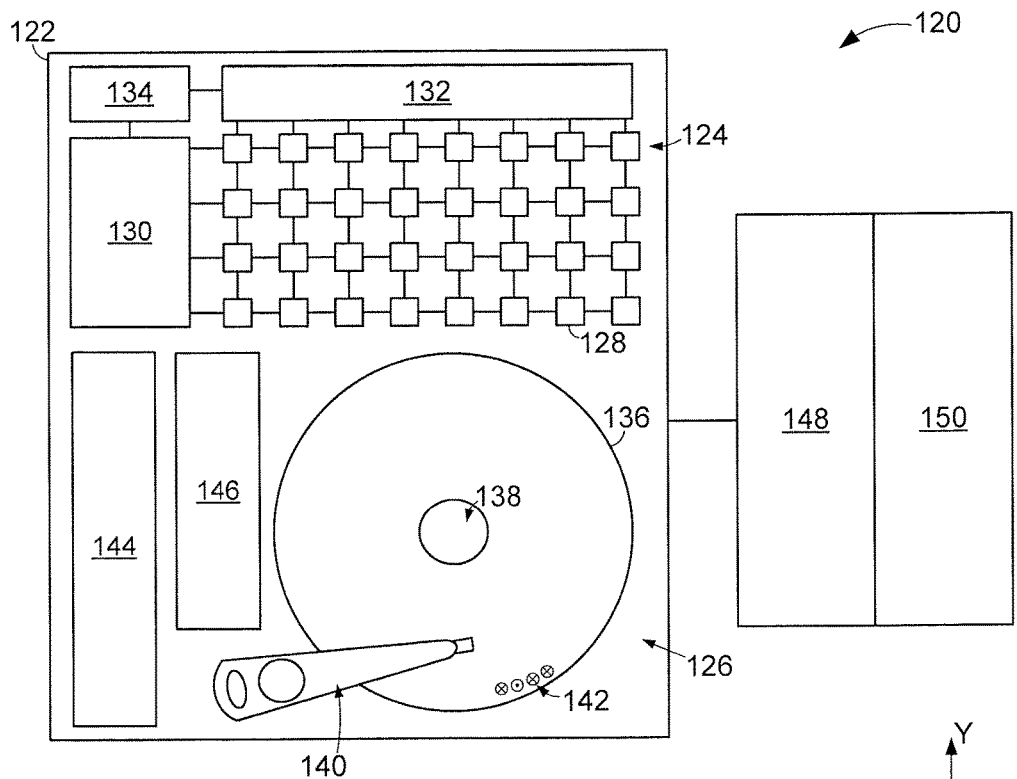
FIG. 2 shows a block representation of portions of an example data storage device capable of being used in the data storage system of FIG. 1.

Such lack of guaranteed access to additional computing capabilities over a network along with other considerations renders the example data storage device 120 of FIG. 2, as illustrated as a block representation in accordance with assorted embodiments. The data storage device 120 has a primary memory space 122 that can be characterized as a hybrid data storage device due to the presence of different types of memory. That is, the primary memory space 122 is a hybrid device that has both solid-state memory 124 and a rotating hard disk drive 126 that provide different data storage characteristics, such as data access speed, that can be utilized in concert to provide optimized data storage.

While not limiting or required, the solid-state memory 124 can have NAND flash, resistive random access memory, spin-torque random access memory, and programmable metallization memory cells 128 organized as a cross-point array. The cells 128 may be selectively accessed as individual cells 128, page of cells, and garbage collection units via bit 130 and source 132 drivers. In other words, the bit 130 and source 132 drivers can operate at the discretion of a local controller 134 to create a data access circuit through one or more memory cells 128 to program data to and read data from the selected memory cells 128.

The rotating hard disk drive 126 is also not limiting or required as shown, but can have, in accordance with various embodiments, a stack of data storage media 136 that are rotated at a predetermined speed by a central spindle motor 138 to create an air bearing on which a portion of an actuating assembly 140 flies to access one or more data bits 142 from the respective data storage media 136. The choreographed movement of the actuating assembly 140 and spindle motor 138 can be enabled by a hard drive controller 144 that facilitates the transfer of pending data accesses, such a data reads and writes, from a local cache 146 to a designated portion of the media stack 136 at opportune times.

The combination of different types of memory in the hybrid data storage device 122 can provide complementary data storage capabilities, such as the use of the solid-state memory 124 as a cache memory for temporary data, such as pending data requests, system overhead information, personalized user metadata like passwords and encryption keys, and maintenance data, while the hard disk drive 126 permanently stores data from various cache memories. The utilization of the solid-state memory 124 as a cache can take advantage of the fast data access speed of solid-state memory cells to complement the long-term reliability of the hard disk drive 126 to deliver enhanced data storage to a host.

Even with the enhanced capabilities of the hybrid data storage device 122, various conditions can promote the use of at least one external interface 148 to connect a secondary memory 150 to the hybrid data storage device 122. The secondary memory 150 may be connected via a network, but is physically connected via the external interface 148 in assorted embodiments to allow the selective engagement, and disengagement, of the secondary memory 150. The addition of the secondary memory 150 can be in an unlimited variety of forms, such as a flash drive, rotating hard disk drive, and hybrid device, to supplement the hybrid data storage device 122.

In some embodiments, the secondary memory 150 supplements the permanent data storage capacity of the hybrid data storage device 122 by allowing a host to selectively program and read that may or may not be resident in the solid-state 124 and hard disk drive 126 memories. Other non-limiting embodiments can utilize the secondary memory 150 to supplement the caching capacity of the solid-state memory 124 in which a controller stores and retrieves data from the secondary memory 150 in accordance with a predetermined caching scheme that may or may not involve host selection. These secondary memory 150 capabilities can extend the usefulness of the hybrid data storage device 122 by expanding capacity and the number of data access operations. In yet, the use of multiple types of memory can occupy additional space compared to singular data storage devices, which can be problematic in the continually decreasing form factors of mobile computing systems.

Figure 3:
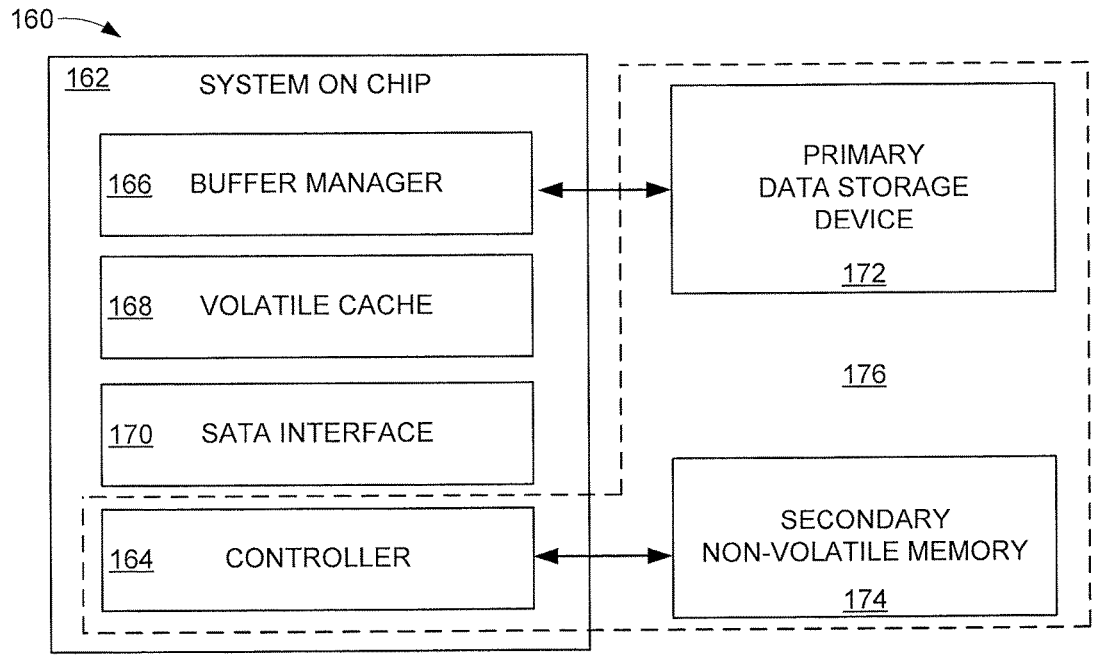
FIG. 3 displays a block representation of a portion of an example mobile data storage system configured in accordance with various embodiments.

FIG. 3 generally illustrates a block representation of a portion of an example mobile data storage system 160 constructed and operated in accordance with some embodiments. The mobile data system 160 may be limited by physical space and power allowance while being stressed by increased heat. Such conditions can render a system on chip (SOC) 162 with at least a controller 164, buffer manager 166, volatile cache 168, such as dynamic random access memory (DRAM), and a SATA interface 170 to facilitate data storage and retrieval with a primary data storage device 172. It should be noted that the primary data storage device 172 may be incorporated in a common housing, such as a rigid case, with the SOC, but such configuration is not required.

Operation of the mobile data storage system 160 may involve the controller 164 directing pending data commands to and from the volatile cache 168 via the buffer manager 166, which may be a supplemental controller dedicated to caching. The addition of a secondary non-volatile memory 174, such as a flash drive connected to an interface external to the SOC, can operate with the primary data storage device 172 to form a hybrid data storage arrangement 176. The controller 164 alone or in concert with the buffer manager 166 and volatile cache 168 can utilize the secondary non-volatile memory as additional cache, temporary storage, or permanent storage to optimize data storage for the mobile system 160.

Despite the ability for a user to create the hybrid data storage arrangement 176 with the engagement of the secondary non-volatile memory 174 with the controller 164, the exclusive use of the secondary non-volatile memory 174 as cache or as user available memory can be insufficient to service some mobile computing environments. For example, a mobile computing device having minimal user data and caching capacities can be stressed by mobile applications, like streaming video, audio file storage, and picture intensive software, which cannot be fully accommodated by dedicated secondary non-volatile memory 174 use. With these issues in mind, various embodiments configure the controller 164 to partition a secondary non-volatile memory 174 into cache and user memory space regions to allow concurrent storage of temporary cache data and user selected permanent data, which supplements both the volatile cache 168 and primary data storage device 172.

Figure 4:
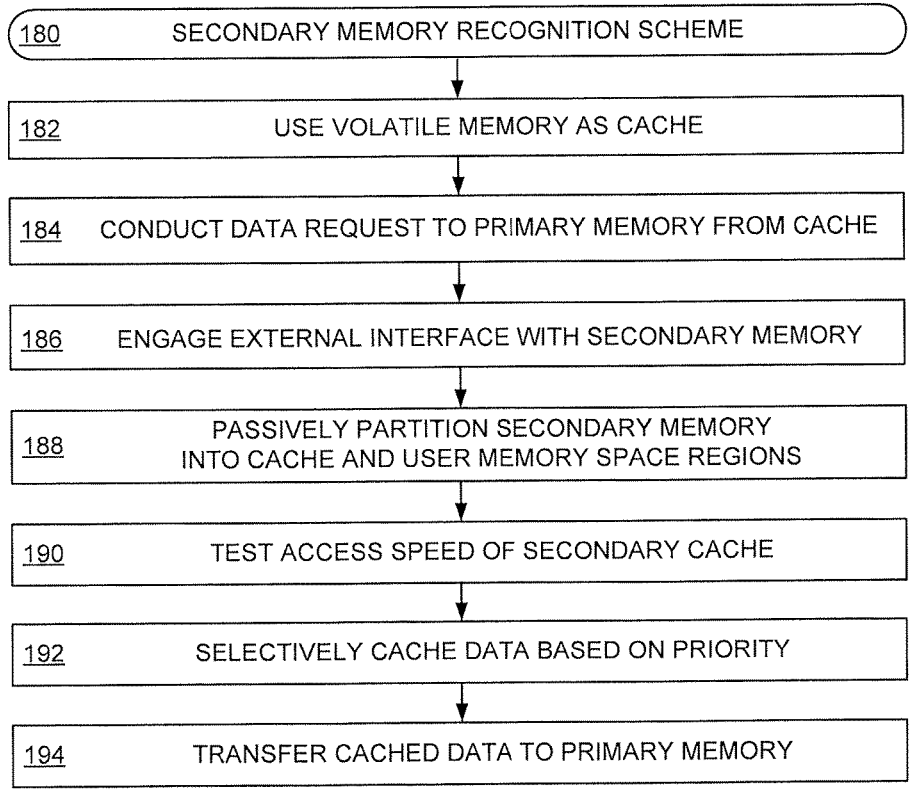
FIG. 4 provides a flowchart of an example secondary memory recognition scheme carried out in accordance with assorted embodiments.

FIG. 4 displays an example secondary memory recognition scheme 180 carried out in accordance with assorted embodiments to optimize the utilization of a secondary memory that has been selectively engaged with a controller via an external interface. Initially, the scheme 180 uses a volatile memory, such as the volatile cache 168 of FIG. 3, as a cache in step 182 for temporary data that may or may not be scheduled for transfer to a primary memory. Step 184 proceeds to process a data request, such as a data read or write request, which calls for data to be transferred between a primary memory, such as a hard disk drive, and the volatile cache. It can be appreciated that steps 182 and 184 can be conducted repeatedly and without a secondary memory being connected to a data storage system.

In step 186, at least one secondary memory is selectively engaged with an interface that is cabled to the SOC so to be external to the circuitry of the SOC. Engagement of the secondary memory in step 186 triggers step 188 to passively partition the secondary memory into at least cache and user memory space regions. While the secondary memory can be partitioned actively through a user designating the number and size of each partitioned region, the exemplary embodiment of FIG. 4 passively partitions the secondary memory by keeping the user memory space region visible and accessible to a host. That is, the term "passively partitioned" is hereby meant as a controller initiated operation that is seamlessly conducted without user initiation.

The passive partitioning of step 188 can be conducted by formatting a portion of the secondary memory in a format that is dissimilar to the user memory space region, but can allow efficient temporary data caching in concert with other caches, such as a volatile cache and a solid-state cache of a hybrid primary memory. With the secondary memory passively partitioned, step 190 can then test the data access speed of the cache region by executing at least one test pattern, which may involve reading and writing data to the secondary memory. The results of the data access speed test can then be used to establish a cache hierarchy in the event other cache locations are being used in conjunction with the secondary cache. However, the secondary cache may, in some embodiments, be used exclusively as cache for data transfer to the user memory space region, which can be particularly useful in the event the secondary memory is a hard disk drive.

Addition of the cache region of the secondary memory to cache previously existing can allow for cache optimization based on a variety of different variables, such as the data access speeds tested in step 190, capacity, and temperature, which can be used to assign priority to the various caches in step 192. Next, step 194 can transfer data and pending data requests between the various caches and eventually to the primary memory as dictated by a controller. The ability to seamlessly add a secondary memory that is automatically integrated into the caching structure of a data storage device while maintaining user data in the user available memory space can concurrently increase the capacity and data access performance of a data storage system.

Figure 5A:
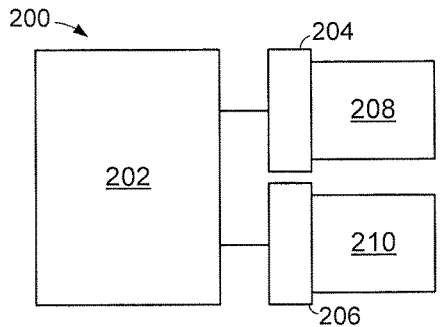
FIGS. 5A and 5B show a block representation and associated operational data of an example data storage system configured in accordance with some embodiments.
Figure 5B:
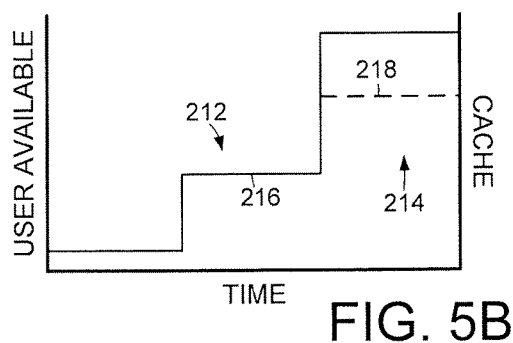

FIGS. 5A and 5B respectively display a block representation and associated operational graph of an example data storage system 200 employing multiple separate secondary memories in accordance with some embodiments. The block representation of FIG. 5A illustrates a primary data storage device 202 that is connected to first 204 and second 206 external interfaces, such as via an SOC and external cabling. The external interfaces 204 and 206 respectively engage separate secondary data storage devices 208 and 210 that can be configured as similar or dissimilar memories at least in terms of memory type, capacity, and data access speed. In an example configuration, the first secondary data storage device 208 is a solid-state data storage device that is passively partitioned into cache and user memory space regions with a 50/50 ratio while the second secondary data storage device 210 is a hybrid data storage device having a hard disk drive and a solid-state cache that is passively partitioned with a 90/10 user memory space to cache ratio due to the device already having dedicated cache space.

The example operational plot of FIG. 5B shows how the capacity of the user memory space and cache regions can change over time with the addition of a first 212 and second 214 secondary data storage device. Solid line 216 plots the user available memory capacity of the data storage system 200 as the first 212 and second 214 secondary data storage devices are successively engaged. In accordance with some embodiments where the ratio of cache to user memory space is different, segmented line 218 corresponds to the cache capacity of the system 200 that can be less than, or more than, the user available memory depending on the controller-designated ratio.

Returning to the example embodiment where dissimilar cache to user memory space is employed, the greater user available data capacity of the hard disk drive would result in the different cache to user available memory capacities shown in FIG. 5B. It should be noted, however, that the ratios can be tuned to have similar or dissimilar user available and cache data capacities even if the secondary data storage devices 208 and 210 have common configurations, such as memory type and capacity. The ability to tune the respective cache and user available data capacities with the connection of multiple secondary data storage devices allows the system 200 to adapt dynamically to changing operating conditions like large command queues and heavy data updating times.

Figure 6:
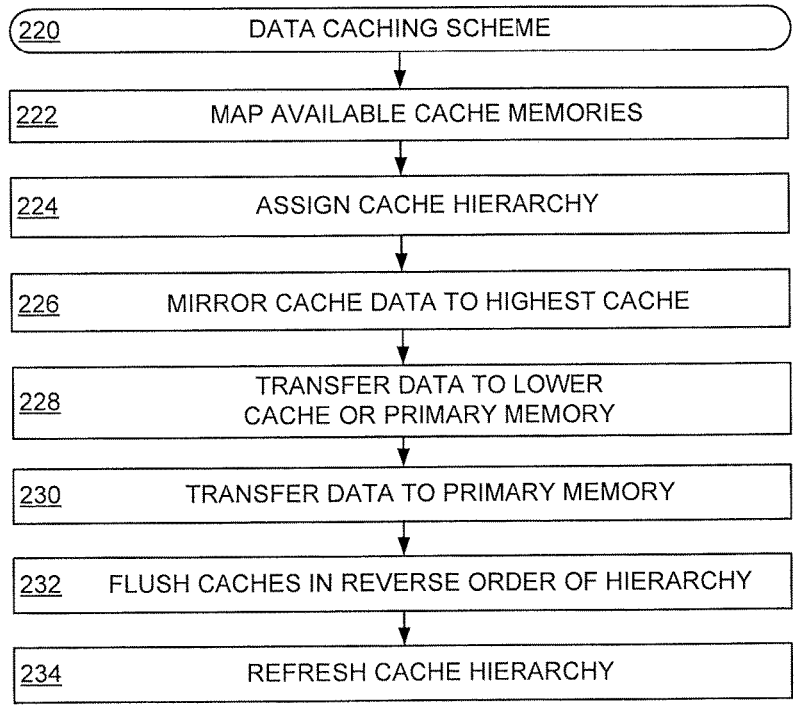
FIG. 6 is a flowchart of an example data caching scheme carried out in accordance with various embodiments.

The capacity of cache and user available memory capacity can be further adapted over time to accommodate data caching schemes where the secondary data storage devices can be disengaged from the system 200 at any time. FIG. 6 shows an example data caching scheme 200 that may be carried out in a data storage system having at least one secondary memory engaging an external interface in accordance with various embodiments. Step 222 begins by mapping available cache memories, which can include at least cache regions of secondary data storage devices after being passively partitioned. The mapping of step 222 may involve the accumulation of biographic data about each cache memory space, such as capacity, data access speed, type, and bit error rate, to allow step 224 more efficiently assign a cache hierarchy for the various caches.

While step 224 is not limited to a particular manner of assigning the cache hierarchy, assorted embodiments sort cache by capacity, such as smallest cache capacity being L1 cache while progressively larger capacities being L2, L3, etc. Other embodiments may sort cache by data access speed or memory type. It should be noted that the cache hierarchy resulting from step 224 can consider the removable capability of the cache regions of the secondary data storage devices, which can reduce the cache's position in the hierarchy due to the potential loss of the memory space at any time. It is contemplated that the cache hierarchy can be split between physical locations. For instance and in no way required or limiting, a tier of cache memory can be split between partial portions of different physical devices, such as volatile cache, non-volatile cache affixed on an SOC, and secondary non-volatile data storage devices.

Step 226 proceeds to move cache data into the cache hierarchy assigned in step 224 by mirroring cache data first to the highest level of cache, which may be the largest or fastest cache memory space in the system according to some embodiments. Such mirroring can be followed by deletion of the cache data resident in the lower cache tier or the redundant cache data may be kept in certain situations, such as the higher cache tier is a removable secondary data storage device. The movement of cache data to the highest cache tier in step 226 can allow step 228 to then transfer the cache data to lower tiers of cache, or the primary memory, according to predetermined cache hierarchy standards, such as the highest cache tier being full, data being stale, and data being present for a certain amount of time.

In the event a piece of cache data reaches the lowest tier of the cache hierarchy, step 230 can transfer the data to the primary memory, if step 228 has not already conducted the transfer. There are various situations where step 228 can transfer data directly to the primary memory without passing through each level of the cache hierarchy, such as cache data being very active, having high priority, and regarding security operations of the overarching system. The storage of cache data and pending data requests in the cache hierarchy can provide efficient use of system resources as steps 226, 228, and 230 can be conducted during selected times, such as system standby modes and slow processing times, so to not inhibit the performance or capabilities of the system.

The movement of cache data throughout the hierarchy in combination with the addition and removal of secondary cache regions can result in large amounts of residual, redundant data that can degrade caching efficiency. As such, step 232 can flush one or more of the caches routinely, randomly, or selectively. In the example embodiment shown in FIG. 6, the cache hierarchy is flushed in reverse order of cache data transfer, which means the lowest cache tier can be flushed before the highest cache tier. Step 232 may flush a hierarchy tier by mirroring the constituent data to a temporary location, such as volatile cache, or may clear the cache tier by deleting the data prior to step 234 refreshing the cache hierarchy by allowing data to be stored to and retrieved from the flushed cache tier.

Step 234 may be conducted individually, in some embodiments, without the flushing of a cache tier, such as when a secondary cache region is removed. Along those same lines, various steps of scheme 220 can be conducted individually in response to secondary data storage devices engaging and disengaging a data storage system. For instance, step 224 can assign a newly partitioned secondary cache region to an existing cache tier without steps 226 and 228 transferring cache data in response. Regardless of the number of times a step is performed individually or collectively with other steps of the scheme 220, the mapping and assigning cache tiers along with the transferring of cache data through some or all of the cache hierarchy can allow large amounts of data and pending data requests to be serviced while appearing seamless to a user.

Figure 7A:
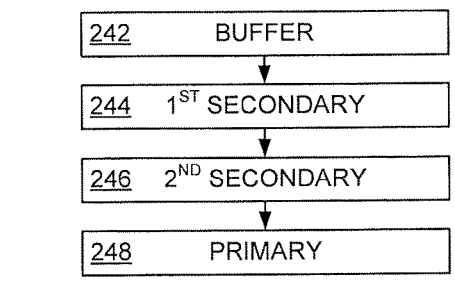
FIGS. 7A and 7B respectively illustrate example cache hierarchies configured and operated in accordance with assorted embodiments.
Figure 7B:
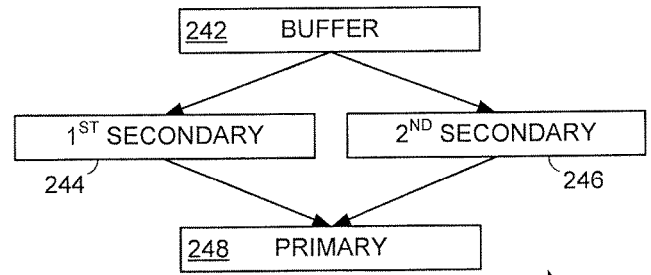

Returning to the concept of assigning cache into a hierarchical structure from step 224, FIGS. 7A and 7B respectively display block representations of cache hierarchies 240 and 250 configured and utilized in accordance with various embodiments. FIG. 7A shows cache hierarchy 240 where a buffer memory space 242, such as a volatile cache, is positioned as the highest cache tier. The high data access speed and relatively small data capacity of the buffer memory space 242 can efficiently facilitate frequent data updates and transfers to other memory spaces. In accordance with the embodiment of FIG. 7A, cache data can pass from the buffer 242 to a first secondary data storage device cache region 244, which may be redundantly mirrored to another memory space to prevent data loss in the event the secondary memory device is disengaged.

Cache data may further be transferred to a second secondary data storage device cache region 246 by a controller when predetermined data conditions are met, such as the priority and staleness of the cache data. The controller may next transfer the cache data and any pending data requests in the second secondary cache region 246 to the primary memory 248, which is a hard disk drive in assorted embodiments. It should be noted that cache data and pending data requests can be transferred to and from the primary memory 248 from any cache tier, without limitation, but can be successively passed through the assigned cache tiers in some embodiments.

FIG. 7B illustrates cache hierarchy 250 where the cache data is mirrored to both the first 244 and second 246 secondary cache regions either concurrently or successively. The mirroring of cache data across the secondary data storage devices 244 and 246, which essentially places the secondary cache regions at the same hierarchy tier, can increase the reliability of cache data in view of the removability of the secondary data storage devices. Such mirroring can further be tuned so that only predetermined types of cache data in the removable secondary data storage devices, such as stale data and metadata associated with data resident on the user memory space regions of the respective secondary data storage devices.

Figure 8:
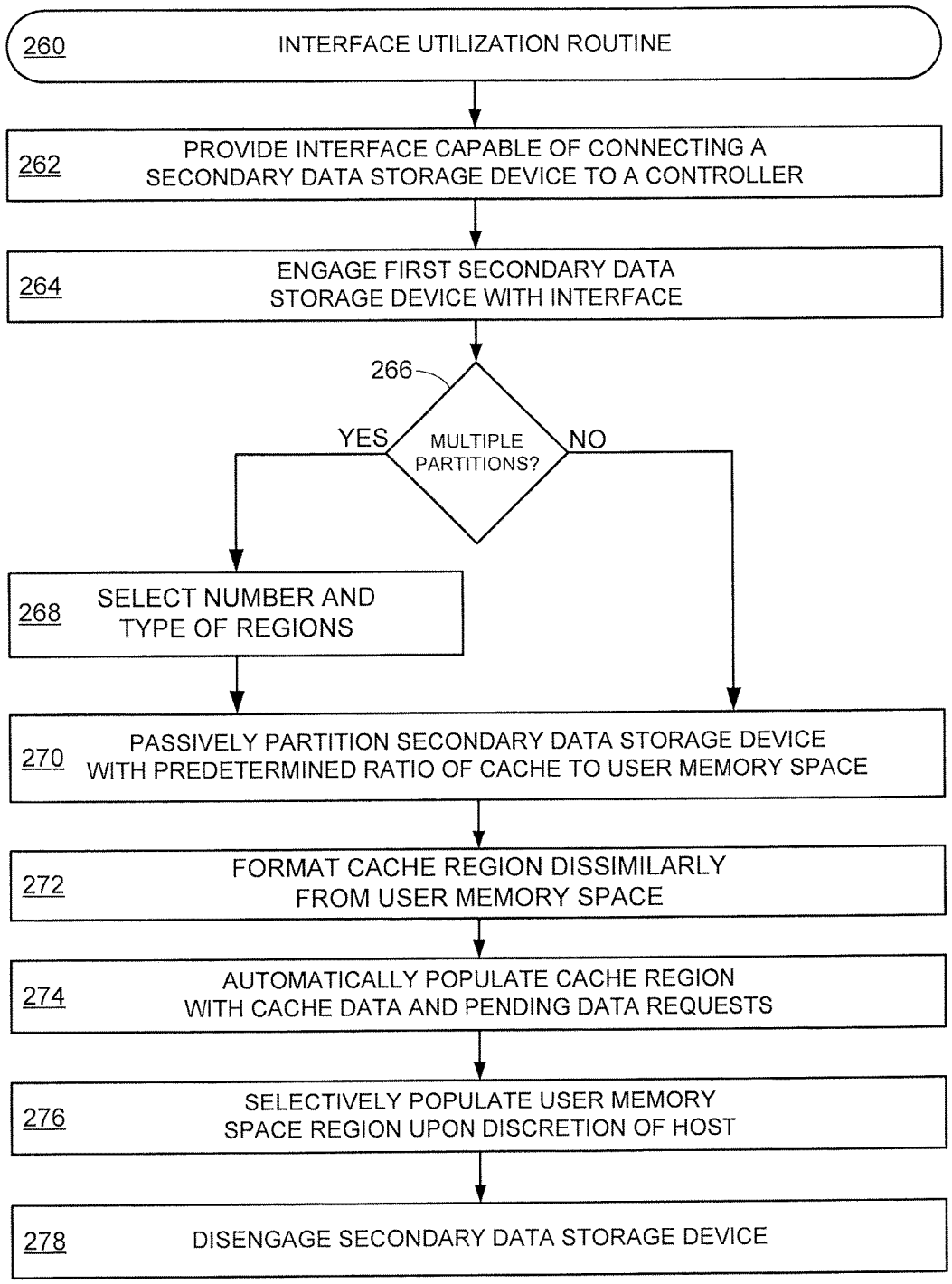
FIG. 8 is an example interface utilization routine capable of being carried out with various embodiments of the present disclosure.

FIG. 8 provides an exemplary interface utilization routine 260 that may be carried out with or without schemes 180 and 220 in accordance with assorted embodiments. While not required or limiting, the routine 260 may initially provide at least one external interface cabled to a controller and capable of connecting a secondary data storage device to that controller in step 262. As discussed above, the interface may be any variety of connections, such as USB and SATA, that facilitate control and data transfer with the secondary data storage device. At least one external interface can subsequently be engaged with a secondary data storage device, such as a flash drive, in step 264.

Decision 266 may then evaluate and determine if multiple partitions are to be created within the secondary data storage device engaged in step 264. If multiple partitions are in order, step 268 selects the number and type of regions, such as 1 cache region and 2 user memory space regions, before step 270 passively partitions the secondary data storage device. In the event a single partition is sufficient, step 270 is triggered to configure the secondary data storage device with cache and user memory space regions in a predetermined ratio. The partitioning of the secondary data storage device can be done by deleting portions of existing data on the secondary data storage device as well as through formatting some or the entire secondary data storage device. Irrespective of the manner in which the secondary data storage device is partitioned, step 272 can subsequently format the cache region exclusively to allow efficient transfer of data between different caches.

With the secondary data storage device partially or fully configured, step 274 can begin automatically populating the cache region with cache data and pending data requests. The automatic population of step 274 is conducted without user selection or manipulation and can be conducted in accordance with predetermined cache hierarchical structure and assignments. Concurrently with step 274 or separately, step 276 can selectively populate the user memory space region of the secondary data storage device at the discretion of the host. In contrast to the automatic population of the cache region in step 274, step 276 is conducted in response to host prompting, which allows data to be retained in the user memory space region before, during, and after steps 270 and 272 establish the cache region.

It is contemplated that routine 260 continually conducts steps 274 and 276 to populate the cache and user memory space regions over time before the secondary data storage device is disengaged from the external interface in step 278. Even with the disengaging of the secondary data storage device in step 278, steps 274 and 276 can be conducted on another secondary data storage device or upon the original secondary data storage device being reengaged with the interface. That is, once a secondary data storage device is partitioned and formatted once, there is no requirement that the device goes through the entire routine 260 again, which can save time and processing power as the same secondary data storage device is cyclically engaged and disengaged with the external interface.

Through the various embodiments of the present disclosure, at least one secondary data storage device can be utilized to supplement an existing computing system. The ability to tune the secondary data storage device for both caching and user available memory allows the data capacity to be increased while performance in servicing pending data requests is optimized. Moreover, the ability to automatically respond to engagement of a secondary data storage device allows a system to passively optimize performance without inhibiting a user's computing experience, such as the loss of user data resident on the secondary data storage device upon engagement with an interface.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a primary memory coupled to a host via a controller and to at least one external interface, the controller adapted to store data to the primary memory alone then passively partition a secondary memory into cache and user memory space regions with a first ratio in response to the secondary memory engaging the at least one external interface, the primary memory being visible and accessible by a host while the secondary memory is passively partitioned, the controller adapted to subsequently passively partition the secondary memory into a different second ratio of user memory space and cache regions to adapt to changing operating conditions in the primary memory, the cache region allocated as cache for the primary memory by the controller.

2. The apparatus of claim 1, wherein the primary memory comprises a rotating data storage device.

3. The apparatus of claim 1, wherein the secondary memory comprises a non-volatile solid-state memory array.

4. The apparatus of claim 1, wherein a buffer memory is coupled to the controller and positioned between the host and primary memory.

5. The apparatus of claim 4, wherein the buffer, secondary, and primary memories form a data hierarchy.

6. The apparatus of claim 1, wherein the controller is positioned on a system-on-chip (SOC) and each external interface is separated from the SOC and connected to the controller via a cable.

7. The apparatus of claim 1, wherein at least one external interface comprises a universal serial bus (USB).

8. The apparatus of claim 1, wherein the user memory space region contains user data before and after the secondary memory is passively partitioned.

9. The apparatus of claim 1, wherein the cache and user memory space regions are formatted dissimilarly.

10. A data storage system comprising a primary memory coupled to a host via a controller and to at least one external interface, the controller adapted to store data to the primary memory alone then passively partition a secondary memory from a first user memory capacity into cache and user memory space regions with a second user memory capacity in response to the secondary memory engaging the at least one external interface, the primary memory being visible and accessible by a host while the secondary memory is passively partitioned, the controller adapted to subsequently passively partition the secondary memory into a different with a third user memory capacity to adapt to changing operating conditions in the primary memory, the third user memory capacity being different than the first and second user memory capacities, the second user memory capacity being less than the first user memory capacity, the cache region allocated as cache for the primary memory by the controller to form a hybrid data storage device.

11. The data storage system of claim 10, wherein first and second external interfaces respectively engage first and second secondary memories.

12. The data storage system of claim 11, wherein the first and second secondary memories are partitioned into different ratios of cache and user memory space regions.

13. The data storage system of claim 11, wherein a cache region of the first secondary memory is assigned by the controller as L1 cache and a cache region of the second secondary memory is assigned as L2 cache by the controller.

14. The data storage system of claim 11, wherein the first secondary memory is passively partitioned into different first and second cache regions and a user memory space region.

15. The data storage system of claim 11, wherein a pending data request is stored in a cache region of the first or second secondary memories based on the data access speed of the respective first and second secondary memories.

16. A method comprising:
coupling a primary memory to a host via a controller and to at least one external interface, the primary memory having a first cache region;
storing data to the first cache region of the primary memory alone;
engaging the at least one external interface with a secondary memory;
partitioning the secondary memory passively from a first user memory capacity into a second cache and user memory space regions having a first ratio with a second user memory capacity via the controller in response to the secondary memory engaging the at least one external interface, the primary memory being visible and accessible by a host while the secondary memory is passively partitioned;
testing the first and second cache regions for data access speeds;
allocating the second cache region as cache for the primary memory with the controller in response to the second cache region having a faster data access speed than the first cache region;
removing the secondary memory from the at least one external interface;
connecting the secondary memory to the at least one external interface;
partitioning the secondary memory passively into a second ratio of a third user memory capacity and cache regions to adapt to changing operating conditions in the primary memory, the first and second ratios being different.

17. The method of claim 16, wherein the secondary memory is passively partitioned while data access operations are being conducted on the primary memory.

18. The method of claim 16, wherein a pending data request is selectively cached in a buffer memory or in the second cache region of the secondary memory by the controller.

19. The method of claim 16, wherein the controller stores personalized metadata in the secondary memory passively.

20. The method of claim 16, wherein the controller recognizes a pre-existing secondary memory partition and bypasses a formatting operation.

* * * * *